US012650308B1

(12) United States Patent
  Carvalho-Ruehle et al.

(10) Patent No.: US 12,650,308 B1
(45) Date of Patent: Jun. 9, 2026

(54) MARINE NAVIGATION SYSTEMS, METHODS, AND USER INTERFACES

(71) Applicant: Brunswick Corporation, Mettawa, IL (US)

(72) Inventors: Raissa Carvalho-Ruehle, Charlotte, MI (US); Anna R. Chi, Lisle, IL (US); Lauren A. McLeod, Gainesville, FL (US)

(73) Assignee: Brunswick Corporation, Mettawa, IL (US)

( * ) Notice: Subject to any disclaimer, the term of this patent is extended or adjusted under 35 U.S.C. 154(b) by 111 days.

(21) Appl. No.: 18/482,530

(22) Filed: Oct. 6, 2023

(51) Int. Cl.
  *B63B 49/00* (2006.01)
  *G01C 21/20* (2006.01)
  (Continued)

(52) U.S. Cl.
  CPC ............ *G01C 21/203* (2013.01); *B63B 49/00* (2013.01); *B63B 43/18* (2013.01); *B63B 79/40* (2020.01);
  (Continued)

(58) Field of Classification Search
  CPC .. B63H 21/21; B63H 25/04; B63H 2025/045; G08G 3/02; B63B 79/40; B63B 43/18;
  (Continued)

(56) References Cited

U.S. PATENT DOCUMENTS 7,561,886 B1    7/2009  Gonring et al.
8,068,037 B2 *  11/2011  Horstemeyer ....... G06Q 20/382
                                       340/995.13
(Continued)

FOREIGN PATENT DOCUMENTS

CN        101469997 A  *  7/2009  ......... G01C 21/3682
CN          1871499 B  *  8/2011  ............ G01C 21/00
            (Continued)

OTHER PUBLICATIONS

Meng, Huadong, et al. "Development and Field Testing of An Interactive Transit Station Information System (ITSIS) Using Connected Vehicle Technologies." (2018). (Year: 2018).*

(Continued)

*Primary Examiner* — Cuong H Nguyen

(74) *Attorney, Agent, or Firm* — Andrus Intellectual Property Law, LLP

(57) ABSTRACT

A method of controlling docking for a marine vessel includes receiving a global position measurement describing a global position of the marine vessel, defining a first navigation pathway through a marine navigation area between the global position of the marine vessel and a navigation target location, wherein the first navigation pathway includes a first set of geographical locations, generating a display representing the marine navigation area and the first navigation pathway on a user interface, receiving a user input via the user interface identifying a through point location to replace at least one geographical location in the first set of geographical locations, and defining an adjusted navigation pathway between the global position of the marine vessel and the navigation target location, wherein the adjusted navigation pathway defines a path through the marine navigation area configured to enable continuous surge movement of the marine vessel past the through point location.

14 Claims, 8 Drawing Sheets

(51) Int. Cl.

| | |
|---|---|
| *G05D 1/02* | (2020.01) |
| *B63B 43/18* | (2006.01) |
| *B63B 79/40* | (2020.01) |
| *B63H 25/04* | (2006.01) |
| *G08G 1/01* | (2006.01) |

(52) U.S. Cl.
CPC .... *B63B 2213/02* (2013.01); *B63H 2025/045* (2013.01); *G08G 1/0137* (2013.01); *G08G 1/0145* (2013.01)

(58) Field of Classification Search
CPC .... B63B 2213/02; B63B 34/05; G05D 1/0206
USPC .................. 455/456.1, 457; 340/516; 701/21
See application file for complete search history.

(56) References Cited

U.S. PATENT DOCUMENTS

| | | | | |
|---|---|---|---|---|
| 8,862,402 | B2 * | 10/2014 | Chomal .................. | B61L 17/00 701/400 |
| 9,671,935 | B2 | 6/2017 | Miichi et al. | |
| 9,952,595 | B2 * | 4/2018 | Arbuckle .............. | B63H 21/21 |
| 10,322,787 | B2 | 6/2019 | Ward | |
| 10,460,484 | B2 | 10/2019 | Hovland et al. | |
| 10,484,365 | B2 * | 11/2019 | Wu ........................ | H04L 9/0877 |
| 11,054,263 | B2 | 7/2021 | Wada | |
| 11,122,479 | B2 * | 9/2021 | Kalkunte ................ | H04W 4/40 |
| 11,257,378 | B2 | 2/2022 | Derginer et al. | |
| 11,403,955 | B2 | 8/2022 | Derginer et al. | |
| 11,762,387 | B2 * | 9/2023 | Behrendt .............. | G06F 3/0486 701/21 |
| 11,772,758 | B2 * | 10/2023 | Moon .................. | G01C 21/387 701/21 |
| 12,263,915 | B1 * | 4/2025 | Koetsier ................. | B63B 21/26 |
| 2011/0125394 | A1 * | 5/2011 | Horstemeyer ..... | G06Q 30/0241 705/14.69 |
| 2015/0089427 | A1 | 3/2015 | Akuzawa | |
| 2016/0182486 | A1 * | 6/2016 | Wu ........................ | H04L 9/0891 726/28 |
| 2017/0255200 | A1 * | 9/2017 | Arbuckle ............. | G05D 1/0206 |
| 2019/0104118 | A1 * | 4/2019 | Wu ........................ | H04L 9/0897 |
| 2019/0340876 | A1 * | 11/2019 | Northrup ............ | G07F 17/3241 |
| 2019/0361457 | A1 | 11/2019 | Johnson et al. | |
| 2020/0062365 | A1 * | 2/2020 | Anderson ........... | H04W 12/068 |
| 2020/0162980 | A1 * | 5/2020 | Kalkunte ............. | H04B 7/0617 |
| 2020/0247518 | A1 | 8/2020 | Dannenberg et al. | |
| 2020/0250992 | A1 * | 8/2020 | Derginer ................ | B63H 25/04 |
| 2021/0389765 | A1 | 12/2021 | Behrendt et al. | |

FOREIGN PATENT DOCUMENTS

| | | | | | |
|---|---|---|---|---|---|
| CN | 109637195 | A * | 4/2019 | .............. | G08G 3/00 |
| CN | 114167854 | A * | 3/2022 | .......... | G05D 1/0208 |
| CN | 116030687 | A * | 4/2023 | .............. | Y02P 90/02 |
| CN | 117029837 | A * | 11/2023 | ............. | G01C 21/20 |
| JP | 2001311626 | A * | 11/2001 | ............. | G01C 21/00 |
| KR | 20210050603 | A * | 5/2021 | .......... | G09B 29/008 |
| KR | 102468668 | B1 * | 11/2022 | ............. | B63H 25/42 |

OTHER PUBLICATIONS

Saklani, Akansha. Geo-Enabled Real Time Emergency Response System using Open System Architecture. Diss. Indian Space Research Organization, 2014. (Year: 2014).*

Papinski, Dominik, and Darren M. Scott. "A GIS-based toolkit for route choice analysis." Journal of Transport Geography 19.3 : 434-442 (Year: 2011).*

E. B. Setiawan et al"Travel Route Recommendation System Based on Weather Prediction and Geolocation Technology," 2023 Inter Conf on Informatics Engineering, Science & Technology (INCIT-EST), Bandung, Indonesia, 2023, pp. 1-7, doi: 10.1109/INCITEST59455.2023.10395920. (Year: 2023).*

Zhou, Xiaoyong, et al. "Identity, location, disease and more: Inferring your secrets from android public resources." Proceedings of the 2013 ACM SIGSAC conference on Computer & communications security. 2013. (Year: 2013).*

Memon, Saba Feroz, et al. "Blind's Eye: Employing Google Directions API for Outdoor Navigation of Visually Impaired Pedestrians." Mehran University Research Journal of Engineering and Technology 36.3 (2017): 693-706. (Year: 2017).*

Song, Xueyuan. On my way: system for optimizing driving routes for crowdsourcing applications. Diss. Rutgers University-Graduate School-New Brunswick,. (Year: 2014).*

Wister, Miguel A., Pablo Pancardo, and Pablo Payro. "Survey on cycling mobile applications for workout performance." Preprints (2017). (Year: 2017).*

Floriani, Leila De, and Paola Magillo. "Representing the visibility structure of a polyhedral terrain through a horizon map." International journal of geographical information systems 10.5 (1996): 541-561.*

Wang, Gang, et al. "A method for coastal global route planning of unmanned ships based on human-like thinking." Journal of Marine Science and Engineering 12.3 (2024): 476.*

Song, Zhaofeng, et al. "A Data-Driven Method for Ship Route Planning Under Dynamic Environments." Journal of Marine Science and Engineering 13.10 (2025): 1901.*

Li, Bing, et al. "Exploring Innovative Methods in Maritime Simulation: A Ship Path Planning System Utilizing Virtual Reality and Numerical Simulation." Journal of Marine Science and Engineering 12.9 (2024): 1587.*

* cited by examiner

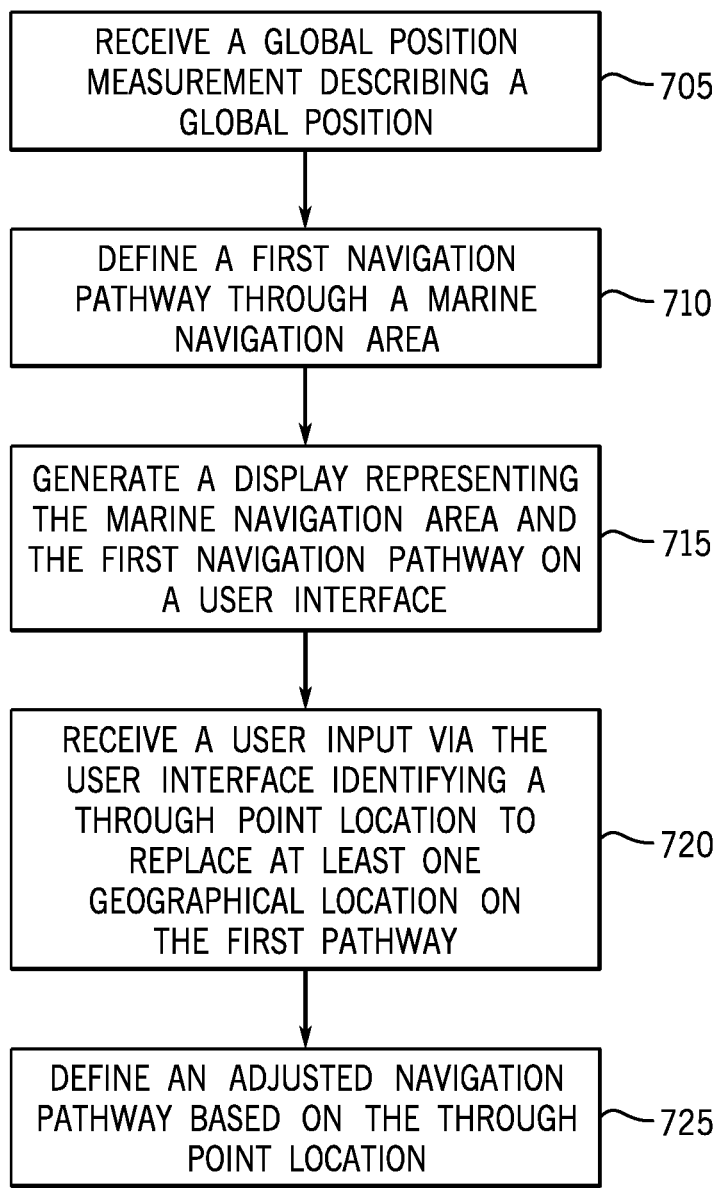

RECEIVE A GLOBAL POSITION MEASUREMENT DESCRIBING A GLOBAL POSITION ~705

DEFINE A FIRST NAVIGATION PATHWAY THROUGH A MARINE NAVIGATION AREA ~710

GENERATE A DISPLAY REPRESENTING THE MARINE NAVIGATION AREA AND THE FIRST NAVIGATION PATHWAY ON A USER INTERFACE ~715

RECEIVE A USER INPUT VIA THE USER INTERFACE IDENTIFYING A THROUGH POINT LOCATION TO REPLACE AT LEAST ONE GEOGRAPHICAL LOCATION ON THE FIRST PATHWAY ~720

DEFINE AN ADJUSTED NAVIGATION PATHWAY BASED ON THE THROUGH POINT LOCATION ~725

MARINE NAVIGATION SYSTEMS, METHODS, AND USER INTERFACES

FIELD

The present disclosure generally relates to systems and methods of facilitating user input and/or controlling navigation for a marine vessel, including for semi-autonomous and autonomous docking controls.

BACKGROUND

The following U.S. Patents and publications provide background information and are incorporated herein by reference, each in its entirety:

U.S. Pat. No. 7,561,886 discloses a method by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

U.S. Pat. No. 11,257,378 discloses a method of controlling a propulsion system on a marine vessel that includes receiving proximity measurements describing locations of one or more objects with respect to the marine vessel, receiving a command vector instructing magnitude and direction for propulsion of the marine vessel with respect to a point of navigation for the marine vessel, and then determining a funnel boundary based on the command vector. An object is identified based on the proximity measurements and determined to be within the funnel boundary, and then a propulsion adjustment command is calculated based on the command vector and an angle of the object with respect to the point of navigation. At least one propulsion device is then controlled based on the propulsion adjustment command in order to avoid the object.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a method of controlling docking for a marine vessel includes receiving a global position measurement describing a global position of the marine vessel, defining a first navigation pathway through a marine navigation area between the global position of the marine vessel and a navigation target location, wherein the first navigation pathway includes a first set of geographical locations, generating a display representing the marine navigation area and the first navigation pathway on a user interface, receiving a user input via the user interface identifying at lest one through point location to replace at least one geographical location in the first set of geographical locations, and defining an adjusted navigation pathway between the global position of the marine vessel and the navigation target location, wherein the adjusted navigation pathway defines a path through the marine navigation area configured to enable continuous surge movement of the marine vessel past the through point location.

In one embodiment, the adjusted path is a smooth path through the navigation area that includes the at least one through point location.

In another embodiment, upon generating the display representing the marine navigation area and the first navigation pathway between the global position of the marine vessel and the navigation target location, the method of controlling docking for a marine vessel may include prompting a user to confirm or adjust the first navigation pathway.

In another embodiment, the method includes receiving user input identifying two or more through point locations that form a created path, wherein the created path defines the adjusted navigation pathway.

In another embodiment, the method includes receiving a selection on the display identifying a start point to the created path and receiving a selection on the display identifying an end point of the created path. In another embodiment, the start point and the end point may be geographical locations in the first set of geographical locations.

In another embodiment, the method includes receiving a selection on the display identifying the at least one geographical location to be replaced and a termination of the selection on the display identifies a selection of the through point location.

In another embodiment, the method includes defining the adjusted navigation pathway to maintain a predetermined distance from an identified object.

In another aspect of the disclosure, a docking system includes a user interface display and a control system. The control system is configured to receive a global position measurement describing a global position of the marine vessel, define a first navigation pathway through a marine navigation area between the global position of the marine vessel and a navigation target location, wherein the first navigation pathway includes a first set of geographical locations, generate a display representing the marine navigation area and the first navigation pathway on a user interface, receive a user input via the user interface identifying at least one through point location to replace at least one geographical location in the first set of geographical locations, and define an adjusted navigation pathway between the global position of the marine vessel and the navigation target location based on the through point location, wherein the adjusted navigation pathway defines a path through the marine navigation area location configured to enable movement of the marine vessel past the through point location.

In one embodiment, the control system is configured to generate the adjusted path as a smooth path through the navigation area that includes the at least one through point location.

In another embodiment, the control system is further configured to, upon generating the display representing the marine navigation area and the first navigation pathway between the global position of the marine vessel and the navigation target location, prompt a user to confirm or adjust the first navigation pathway.

In another embodiment, the control system is further configured to receive user input identifying two or more through point locations that form a created path, wherein the created path defines the adjusted navigation pathway.

In another embodiment, the control system is further configured to receive a selection on the display identifying a start point to the created path and receiving a selection on the display identifying an end point of the created path.

In embodiments where the user desires to adjust the selected docking location, the control system may be further configured to receive a user input instructing an adjustment direction, and in response to receiving the user input instructing the adjustment direction, move the selected docking location accordingly.

In another embodiment, the control system is further configured to receive two or more selections on the display identifying two or more geographical locations to be replaced and receive two or more selections on the display identifying two or more through point locations. In another embodiment, a first portion of the first navigation pathway remains unchanged while the two or more through point locations adjust a second portion of the first navigation pathway and the adjusted navigation pathway comprises the first portion of the first navigation pathway and the adjusted second portion of the first navigation pathway.

BRIEF DESCRIPTION OF THE DRAWINGS

The present disclosure includes the following Figures.

FIGS. 7-8 illustrate exemplary methods for controlling navigation for a marine vessel in accordance with embodiments of the present disclosure.

DETAILED DESCRIPTION

Figure 1:
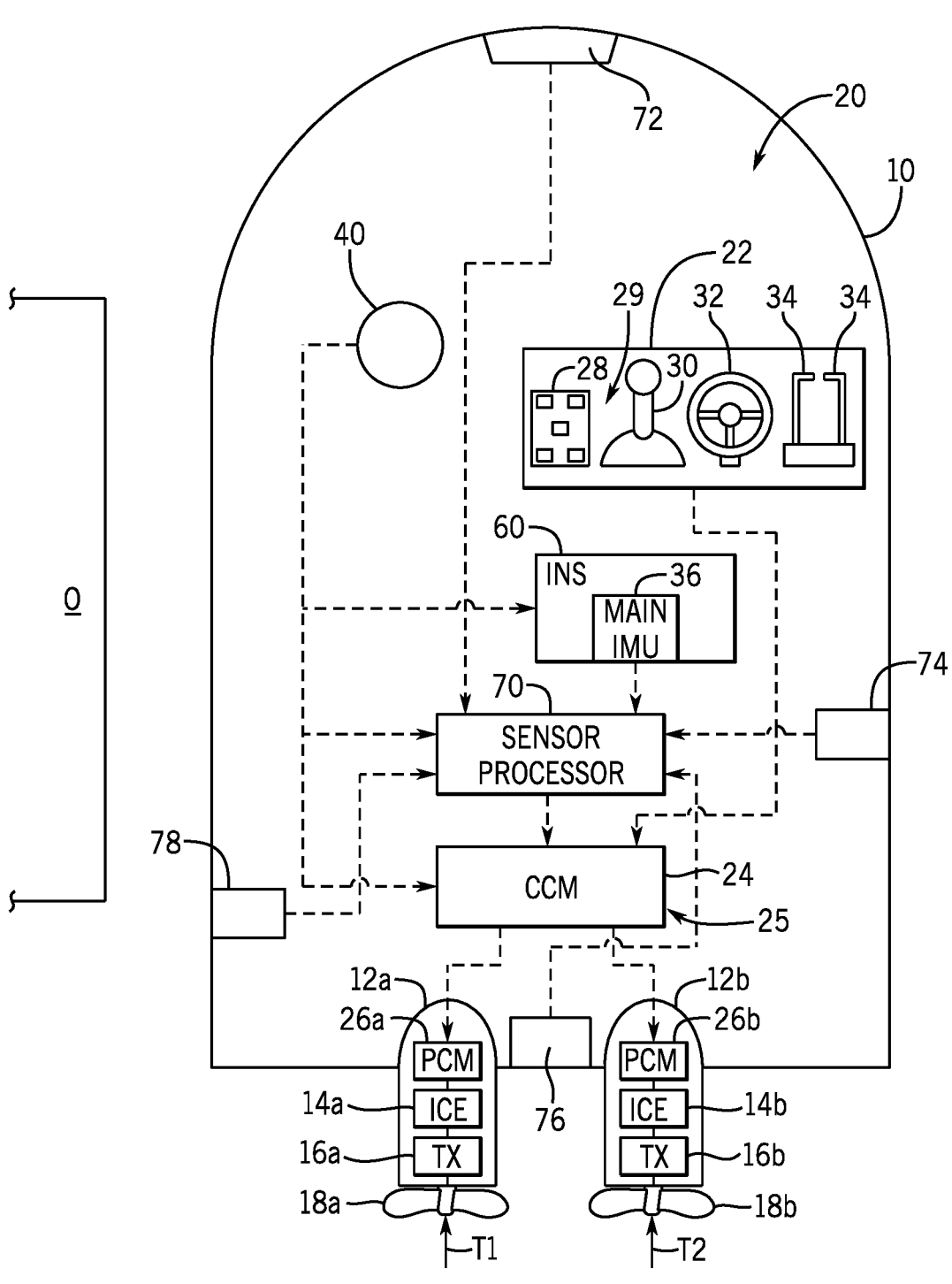
FIG. 1 is a schematic representation of an exemplary propulsion system on a marine vessel according to one embodiment of the present disclosure.

The present disclosure relates to marine vessel navigation and docking, including autonomous navigation and semi-autonomous driver assistance systems. The inventors have recognized that user interface systems and methods for docking need to be easy for an operator to use in marine conditions, including when the vessel is rolling and pitching in large waves or windy conditions. Sometimes the display on the user interface is small enough that selecting a precise location for marine navigation is difficult to choose within the marine navigation area. Additionally, vessel motion, harsh lighting, and weather conditions such as precipitation can make it difficult to see and interpret displays at the helm, which often show a large amount of information in a small area.

Moreover, marine navigation is complicated by the multiple axes of vessel movement, lack of precision control over vessel position and movement, and relative unconstrained navigation options compared to typical automotive navigation. Marine navigation is relatively unconstrained compared to navigation on established land roadways because waterways typically permit vessels to navigate in any direction and permit vessels to occupy anywhere on the waterway and travel in any direction that they are physically able to travel. Moreover, many marine vessels (such as those equipped with joystick piloting) are capable of effectuating movement in any direction on the water, including sideways motion and turning in place. Thus, there are typically innumerable possible pathways for navigating a vessel through a marine environment.

Existing solutions for defining navigation pathways include methods of using an auto heading and/or auto piloting, such as based on perception sensors and systems and/or GPS tracking. These navigation methods plan a path for the marine vessel to reach the navigation target location, but such paths are often imperfect and/or do not meet a user's navigation preferences. The inventors have recognized that current marine navigation systems and interfaces do not offer user interfaces that enable intuitive or easy user adjustment a navigation path, including to select and adjust a portion of a generated navigation pathway, and thus improved user interfaces are needed that are tailored to and account for the particularities of marine navigation.

Given those challenges, the inventors developed the disclosed system to provide driver assistance and/or automated control functionality to facilitate path adjustment user input and define an adjusted navigation pathway between the global position of the marine vessel and the navigation target location. The inventors have devised systems and vessel control methods providing a display that facilitates adjustments to a first navigation pathway through a marine navigation area, such as by replacement of one or more of the geographic locations on the first navigation pathway by one or more through point locations. The control system is configured to identify and display an adjusted navigation pathway based on user input received that identifies one or more through point locations within the marine navigation area. In one embodiment, the imaging system may image an area around the marine vessel to generate image data that the control system may use to generate the display representing the marine navigation area on the user interface.

The user interface display may provide a plurality of selectable locations on the display that correlate with the area surrounding the marine vessel. In one embodiment, selection of a first location is used to identify a rough estimate of the desired location and orientation of the marine vessel within the marine navigation area. Thereafter, the control system may prompt the user to input adjustments, such as by presenting selectable adjustment indicators, and/or to confirm whether the first navigation pathway is defined according to the user's preferences. The adjustments to the first navigation pathway may be configured to facilitate a direction adjustment user input to adjust the position and orientation of the first navigation pathway by a predetermined amount based on user input received. Upon receiving user input finalizing the adjusted navigation pathway, the adjusted navigation pathway is set as the path for the marine vessel to travel to the navigation pathway that the marine vessel will navigate toward for autonomous or semi-autonomous docking control.

FIG. 1 shows a marine vessel 10 equipped with a propulsion system 20 configured according to one embodiment of the disclosure. The propulsion system 20 is capable of operating, for example, in a joysticking mode where a joystick is operated by an operator to control vessel movement within an x/y plane, among other modes, as described hereinbelow. The propulsion system 20 has first and second marine drives 12a, 12b that produce first and second thrusts T1, T2 to propel the vessel 10. The first and second marine drives 12a, 12b are illustrated as outboard motors, but they could alternatively be inboard motors, stern drives, jet drives, or pod drives. In one embodiment, each marine drive 12a, 12b is provided with a powerhead, such as an engine 14a, 14b, operatively connected to a transmission 16a, 16b, in turn, operatively connected to a propeller 18a, 18b. In other embodiments, the powerhead may be an electric motor (e.g., powered by a battery or other power storage system) or a hybrid system comprising one or more of an electric motor and an internal combustion engine configured to initiate rotation of the propeller 18a, 18b.

The vessel 10 also houses various control elements that comprise part of the control system 25 for the propulsion system 20. The control system 25 comprises one or more controllers communicatively connected, and an operation console 22 in signal communication therewith, for example via a communication bus such as a CAN bus arrangement as described in U.S. Pat. No. 6,273,771. The one or more controllers of the control system 25 may comprise multiple hardware control devices communicatively connected, each including a hardware processor, such as for example a central controller 24 (e.g., shown as a command control module (CCM)) and/or propulsion control modules (PCM) 26a, 26b associated with the respective marine drives 12a, 12b. Each controller in the control system 25, such as controller 24 and the PCMs 26a, 26b, may include a memory and a programmable processor. As is conventional, each controller 24, 26a, 26b includes a processor communicatively connected to a storage system comprising a computer-readable medium that includes volatile or nonvolatile memory upon which computer-readable code and data are stored. The processor can access the computer-readable code and, upon executing the code, carry out functions, such as the navigation control functions and/or the proximity sensing functions, as described in detail below.

The control system 25 may further include one or more sensor processors 70, such as image processors configured to process the image data from the one or more image sensors 72-78. In one embodiment, an imaging system may include the one or more image sensors 72-78 and image processors and be configured to image an area around the marine vessel 10 to generate image data that the control system may use to generate the display representing the marine navigation area on the user interface. Alternatively or additionally, the display representing the marine navigation area may be based on a global position measurement of the marine vessel 10 and/or chart data stored in memory. In one embodiment, the control system may define the regions of the display based on a grid system that utilizes a spatial plane, such as defined according to a known geographic coordinate system (e.g., GPS coordinates). Alternatively or additionally, the imaging system may capture measurements of distance from the marine vessel 10. The control system may generate a grid system of equivalents that correlate measurements determined from received image data to a proportional representation on the display.

Given the large amount of image data produced by the image sensors 72-78, the connection between the sensors 72-78 and the sensor processor 70 may be via a dedicated bus or network connection. This dedicated bus or network connection is separate from the vessel network to allow transmission of a large amount of proximity measurement data (and, in some embodiments, IMU data) to the sensor processor 70. Such data transmission may not be possible on a typical vessel network, such as a CAN bus or wireless network where multiple devices are communicating. In still other embodiments, a dedicated communication link may be provided between the sensor processor 70 and the propulsion controller, such as the central controller 24.

The operation console 22 includes a number of user input devices, such as a keypad 28, a joystick 30, a steering wheel 32, and one or more throttle/shift levers 34. The operation console 22 may further include an operation console display 29, such as may be associated with an onboard management system and/or a user interface, that is configured to visually present information to the operator (e.g., information regarding control mode, control settings, tie-off displays, suggested tie-off patterns, available docking locations, and docking optimization instructions), present control options to the operator, and receive user input from the operator in response to the control options. One example of such a display system is Vessel View® by Mercury Marine Company of Fond du Lac, Wisconsin. The operation console 22 and user interface system may further include one or more mobile devices not positioned at the helm of the vessel, such as a user's mobile device communicating with the control system 25 via an application, such as via Vessel View Mobile® by Mercury Marine. Each of these devices inputs commands to the control system 25. Controllers 24 within the control system 25, in turn, communicate control instructions to the first and second marine drives 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the marine drives 12a, 12b. The marine drives 12a, 12b are independently steerable about their steering axes. The throttle/shift levers 34 send signals to the controller 24 regarding the desired gear (forward, reverse, or neutral) of the transmissions 16a, 16b and/or the desired rotational speed of the engines 14a, 14b of the marine drives 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10.

The propulsion system 20 also includes one or more image sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The image sensors 72-78 include visual light sensors, distance sensors, and/or directional sensors configured to generate image data. For example, each of the image sensors 72-78 may be any one of a radar sensor, sonar sensor, standard visual light camera, stereovision camera or other camera configured to measure depth information, laser sensor (e.g. lidar or Leddar), Doppler direction finder, or other devices individually capable of determining both the distance and direction (at least approximately), i.e. the relative position of an object O with respect to the vessel 10, such as a dock, a seawall, a piling, another vessel, etc. The sensors 72-78 provide information regarding both a direction of the object with respect to the marine vessel 10 and the shortest distance between object O and the vessel 10.

Regarding the image sensors 72, 74, 76, 78, note that different types of sensors may be used depending on the distance between the vessel 10 and the object O and/or its relative direction to the vessel 10. For example, radar sensors may be used to detect objects at further distances. Once the vessel 10 comes within a particular distance of the object, lidar, ultrasonic, Leddar, or sonar sensors may instead be used. Camera sensors (such as including one or more stereovision cameras) may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the image sensors are positioned at each of the front, sides, and stern of the vessel 10, and include front-facing sensor 72, starboard-facing sensor 74, rear-facing sensor 76, and port-facing sensor 78. In a different exemplary sensor arrangement, two image sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and/or visual light cameras) to sense the shortest distance and the direction of the object with respect to the vessel 10. Alternatively, the sensor processor may use all available sensor data from all sensor types, which may be reviewed real-time as it is received or may be formulated into one or more maps or occupancy grids integrating all proximity measurement data, where the mapped data from all the operated sensors is processed as described herein. In such an embodiment, the proximity measurements and other information from the image data from each of the various sensors are all translated into a common reference frame, such as represented in a point cloud, occupancy grid, or other map of the environment. In one embodiment, the control system is configured to correlate these maps or occupancy grids with a grid of the display and/or with one or more selectable locations on the display of the marine navigation area.

Autonomous and/or advanced operator assistance (i.e., semi-autonomous) controls for improved vessel handling qualities require the placement of multiple image sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e., the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, an inertial measurement unit (IMU) 36 is installed at a known location on the marine vessel with respect to a predefined point of navigation, such as the center of rotation (COR) or center of gravity (COG). The installation orientation or the IMU 36 is also known. The installation locations of the IMU 36 and each proximity sensor 72-78 are established as part of a calibration procedure for the proximity sensing system.

Referencing the example in FIG. 1, the IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the IMU 36 and may also receive information from a GPS receiver 40 comprising part of a global positioning system (GPS). The GPS receiver 40 is located at a pre-selected fixed position on the vessel 10, which provides information related to global position of the marine vessel 10. The IMU 36 is also located at a known and fixed position with respect to the center of navigation determined for the marine vessel 10, such as the COR or COG. In one embodiment, the control system may visually represent the global position of the marine vessel 10 on the display of the marine navigation area.

The inventors have recognized that the above-mentioned operational challenges posed by a marine environment can be effectively dealt with by establishing and maintaining a buffer distance around the marine vessel, where the control authority provided to an operator is limited based on the buffer distance. For example, the control system 25 may continuously calculate a maximum velocity, or velocity limit, for the marine vessel as it approaches an object O, and may limit an operator's authority in controlling the propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls to force the marine vessel 10 away from the object O when the buffer zone is violated.

Figure 2:
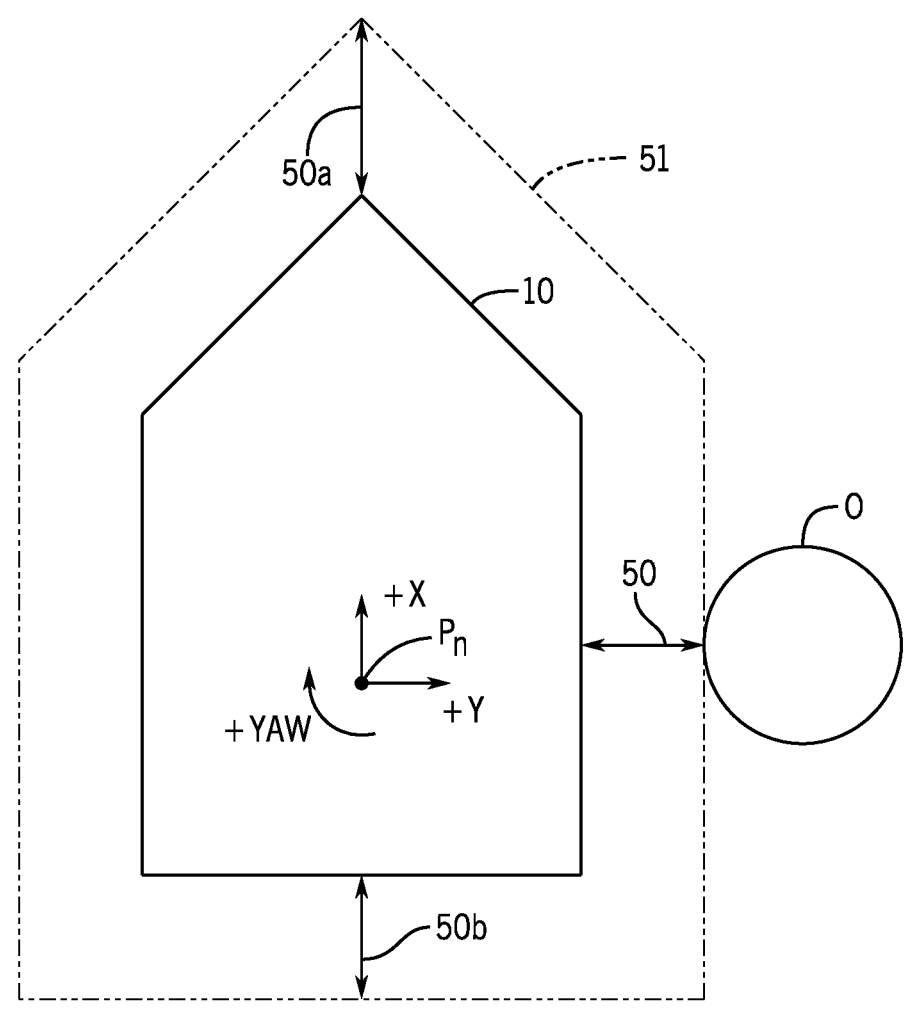
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

Maintenance of the entire buffer zone is not always desired or practical, such as when the vessel is being docked and/or otherwise positioned to allow passengers to get on and off the marine vessel. Thus, the control system 25 may be configured to limit an operator's authority to control propulsion of the marine vessel in the direction of the object so as to provide a controlled approach and impact to an object, such as a dock. The control system 25 may be configured to modify or disable collision avoidance algorithms, such as the velocity limiting and autonomous buffer maintenance controls, upon receipt of a user-generated instruction to suspend the maintenance of the buffer distance from the object, such as the dock. In some embodiments, the control system remains responsive to user control inputs via a user input device, such as a joystick, to move the marine vessel in the direction of the object so as to provide a smooth and controlled impact between the marine vessel and the object, and/or to hold the marine vessel against the object, such as while passengers disembark. The user control, such as via the joystick 30, remains intuitive during the velocity-limited control modality. For example, the limited user input authority provided via the joystick may be implemented by rescaling and/or offsetting the propulsion commands associated with the joystick positions.

In other embodiments, the control system 25 provides autonomous control of propulsion so as to navigate the marine vessel 10 in tight spaces, such as during docking and launch. The inventors have recognized that docking a marine vessel is a challenging task, especially with external factors common in marine environments, such as wind, waves, and current. Accordingly, the inventors have recognized that autonomous control may be beneficial for certain marine vessel control tasks, especially those tasks requiring high visibility at all points around the marine vessel and/or precise propulsion control. Accordingly, the control system 25 may be configured to execute steps to move the marine vessel safely to a navigation target location, which may be performed autonomously utilizing advanced closed-loop control in conjunction with image sensors at key points around the marine vessel.

The autonomous or semi-autonomous control algorithms, such as effectuated by the control system 25, include velocity control software performing algorithms to calculate a maximum velocity for the marine vessel 10 as it approaches an object O. Where propulsion control is based on user input, the control system 25 may calculate a maximum velocity for the vessel and effectuate velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined, such as based on handling, comfort, or safety metrics.

Figure 3:
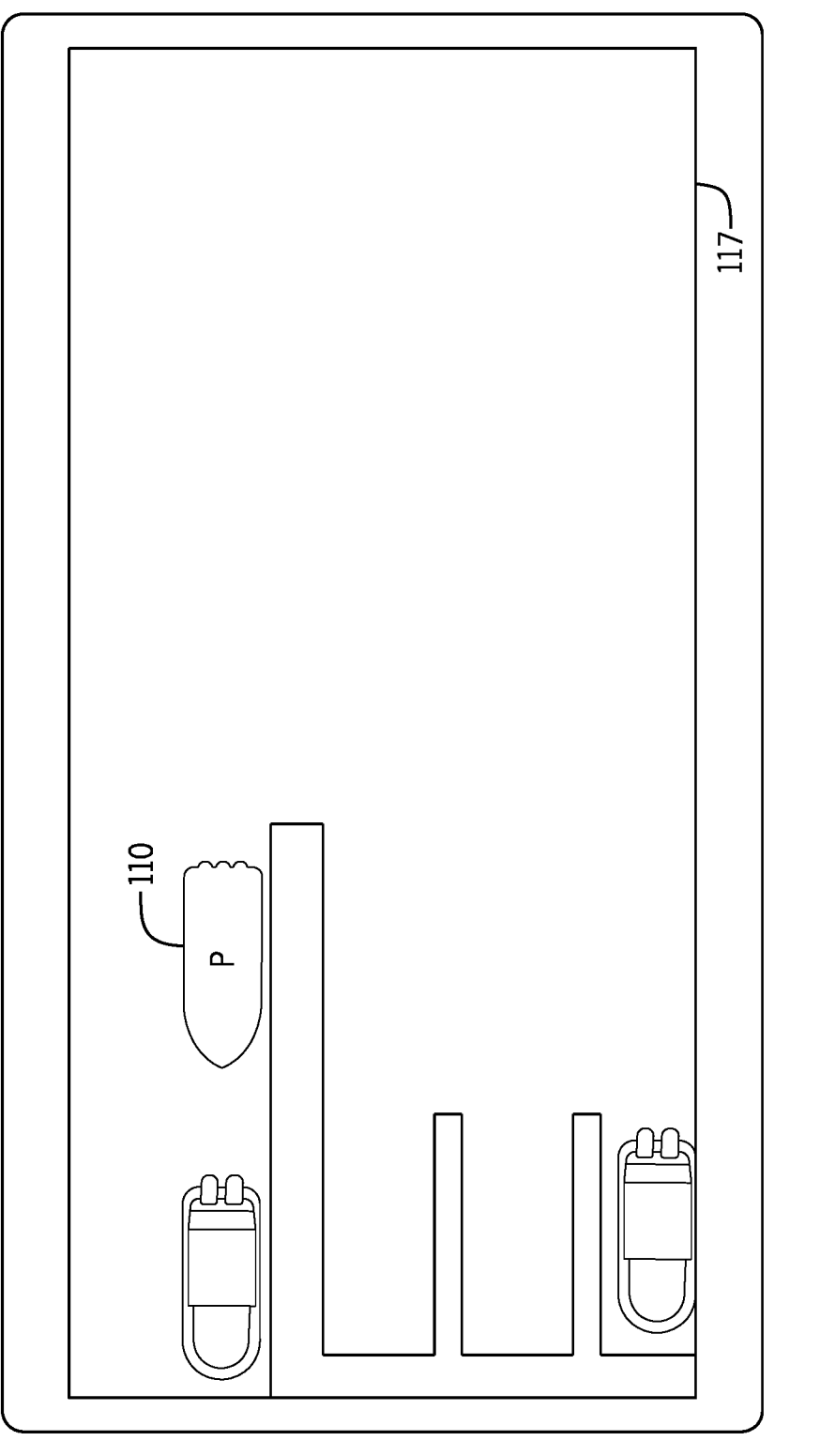
FIG. 3 illustrates a navigation target location within a marine navigation area according to one embodiment of the present disclosure.

In certain embodiments, the control system 25 may be configured to identify potential docking surfaces in the marine environment around the vessel 10 based on the proximity measurements 90 by the various image sensors 72-78. Referring now to FIG. 3, a navigation target location 110 within a marine navigation area is illustrated. In one embodiment, the navigation target location 110 may be a desired future location of the marine vessel within the marine navigation area. User input is received by the control system as the user selects a location on the display 117 of the user interface that represents the marine navigation area. In one embodiment, the control system may present one or more selectable locations as options for navigation target locations 110. In another embodiment, the control system may access a stored buffer zone (from predetermined settings or an accessible database stored in memory) and account for any buffer distances when placing a navigation target location 110. The control system may place the navigation target location 110 as close to the geographic location correlated to the selected location on the display 117 as possible. In one embodiment, placement of the navigation target location 110 is determined by matching a known location such as such as the center of rotation (COR) or center of gravity (COG) to the closest geographical location associated with the selected location on the display.

Figure 4:
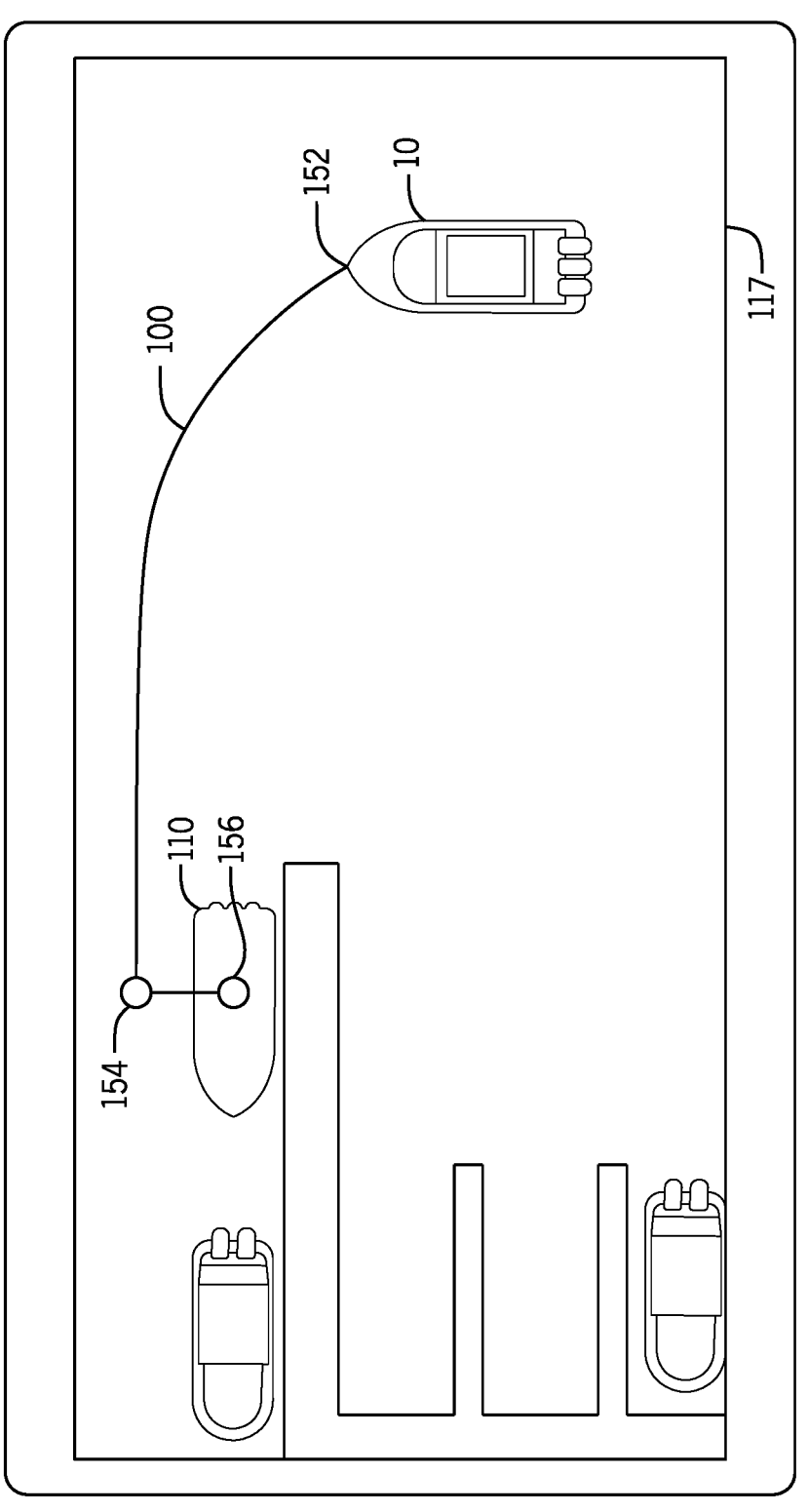
FIG. 4 is an exemplary display of a marine navigation area indicating a navigation target location and a navigable pathway according to one embodiment of the present disclosure.

Referring now to FIG. 4, the control system may receive a global position measurement describing a global position of the marine vessel 10. The control system may define a first navigation pathway 100 through the marine navigation area between the global position of the marine vessel 10 and the navigation target location 110. In one embodiment, the first navigation pathway 100 may include a first set of geographical locations indicating the geographical location of the first navigation pathway 100. The control system may generate a display 117 on the user interface that represents the marine navigation area and the first navigation pathway 100. The first set of geographical locations defining the first navigation pathway 100 may include a start point 152 and/or an end point 156. The first navigation pathway 100 may include one or more turn points 154. At a turn point 154, the thrust direction may change, such as between surge and sway or surge and yaw as the marine vessel 10 navigates towards the navigation target location 100.

In one embodiment, the imaging system may image an area around the marine vessel 10 to generate image data. The control system may use this image data to determine the first navigation pathway and/or the adjusted navigation pathway described in FIG. 5. Similarly, the control system may generate the display representing the marine navigation area on the user interface based on the image data. In another embodiment, the control system may identify at least one object in the image data between the global position of the marine vessel 10 and the navigation target location 110 and define the first navigation pathway 100 as a pathway that avoids the identified object. The control system may define the first navigation pathway 100 and/or the adjusted navigation pathway to maintain a predetermined distance from the identified object, which may be an above-water object or a below-water object such as a shallow area.

In one embodiment, upon generating the display 117 representing the marine navigation area and the first navigation pathway 100 between the global position of the marine vessel 10 and the navigation target location 110, the control system may prompt a user to confirm or adjust the first navigation pathway 100. The presentation of the first navigation pathway 100 on the display 117 may allow the user to preview the first navigation pathway 100 before the marine vessel is in motion. Adjustments to the first navigation pathway 100 received by the control system may navigate the marine vessel around obstacles that the control system may not detect either through the imaging system, map data, and/or chart data, such as an underwater formation that may be undetected by a navigation system unpaired with a sonar or radar system. As another example, the imaging system may only be configured to identify objects of a threshold size, such as that are larger than the size of a basketball. A user may perceive objects that are not perceived by the perception system, or may chose to give a wider berth to certain objects that may be insufficiently perceived or misperceived by the perception system, and thus may adjust portions of a path to avoid such objects.

In one embodiment, the navigation system may identify a first navigation pathway in conjunction with navigation tools and systems, such as waypoint navigation or autodocking. The control system may receive a command from a navigation tool, such as a selection of a navigation target location, and define a first navigation pathway 100 based on the received user input from the navigation tool. The control system may, upon identification of a navigation target location, define a first navigation pathway from the global position of the marine vessel to the navigation target location 110. The docking system may receive any navigation target location 110, with sufficient water for the marine vessel 10 to access the navigation target location 110, within the marine navigation area as a navigation target location 110. Similarly, the first navigation pathway may be one of a plurality of potential navigation pathways. Excepting defined passageways such as bridges and narrow passes, or other areas with defined rules for navigation, the first navigation pathway may occupy any portion of the marine navigation area that directs the marine vessel from its current global position to the navigation target location. In one embodiment, the first navigation pathway as defined by the control system may be an optimized route based on a predetermined setting, such as the most fuel efficient, the shortest distance, or the shortest amount of travel time.

Figure 5:
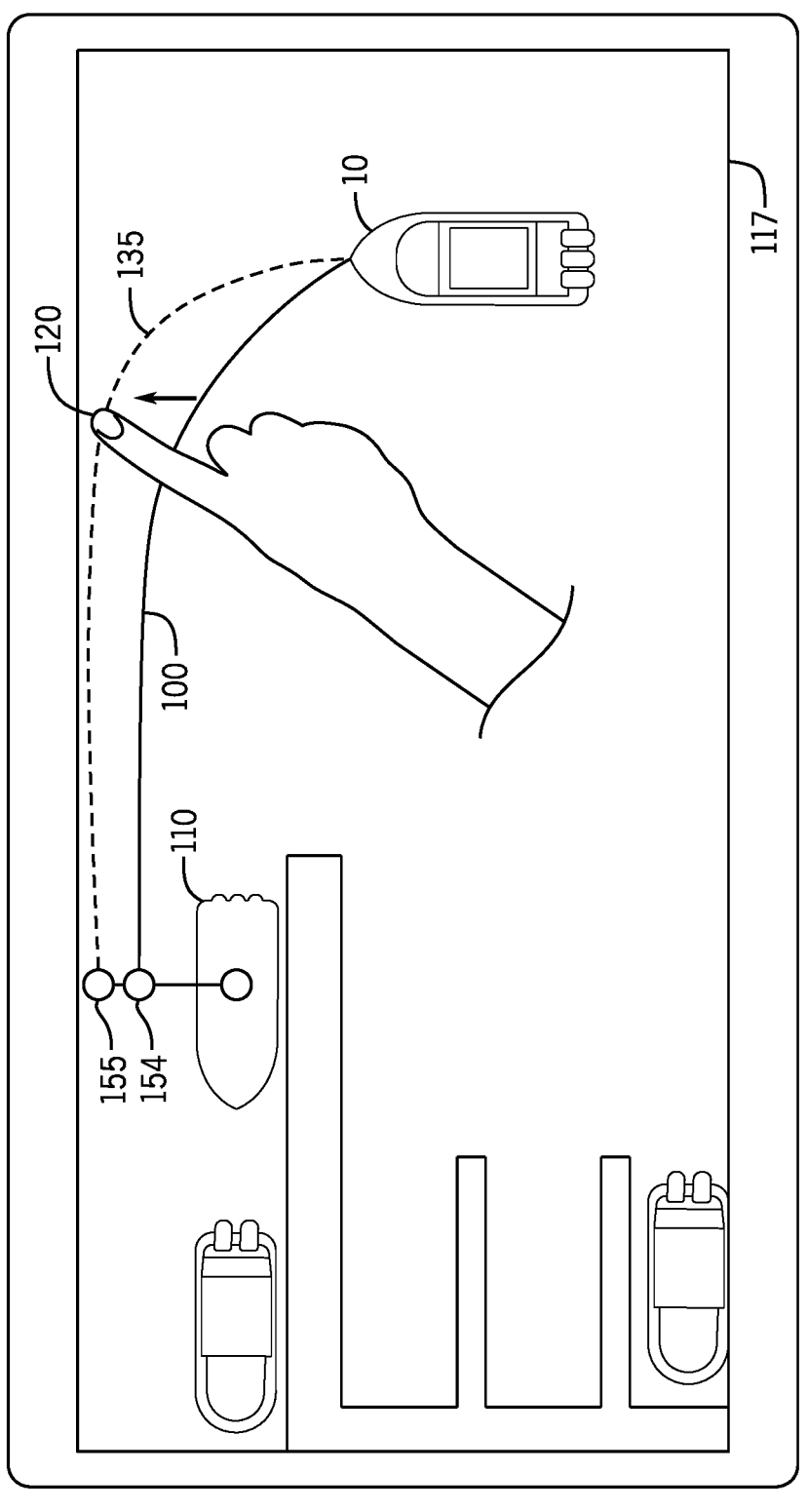
FIG. 5 is an exemplary display of an adjustment direction adjusting a navigable pathway according to one embodiment of the present disclosure.
Figure 6:
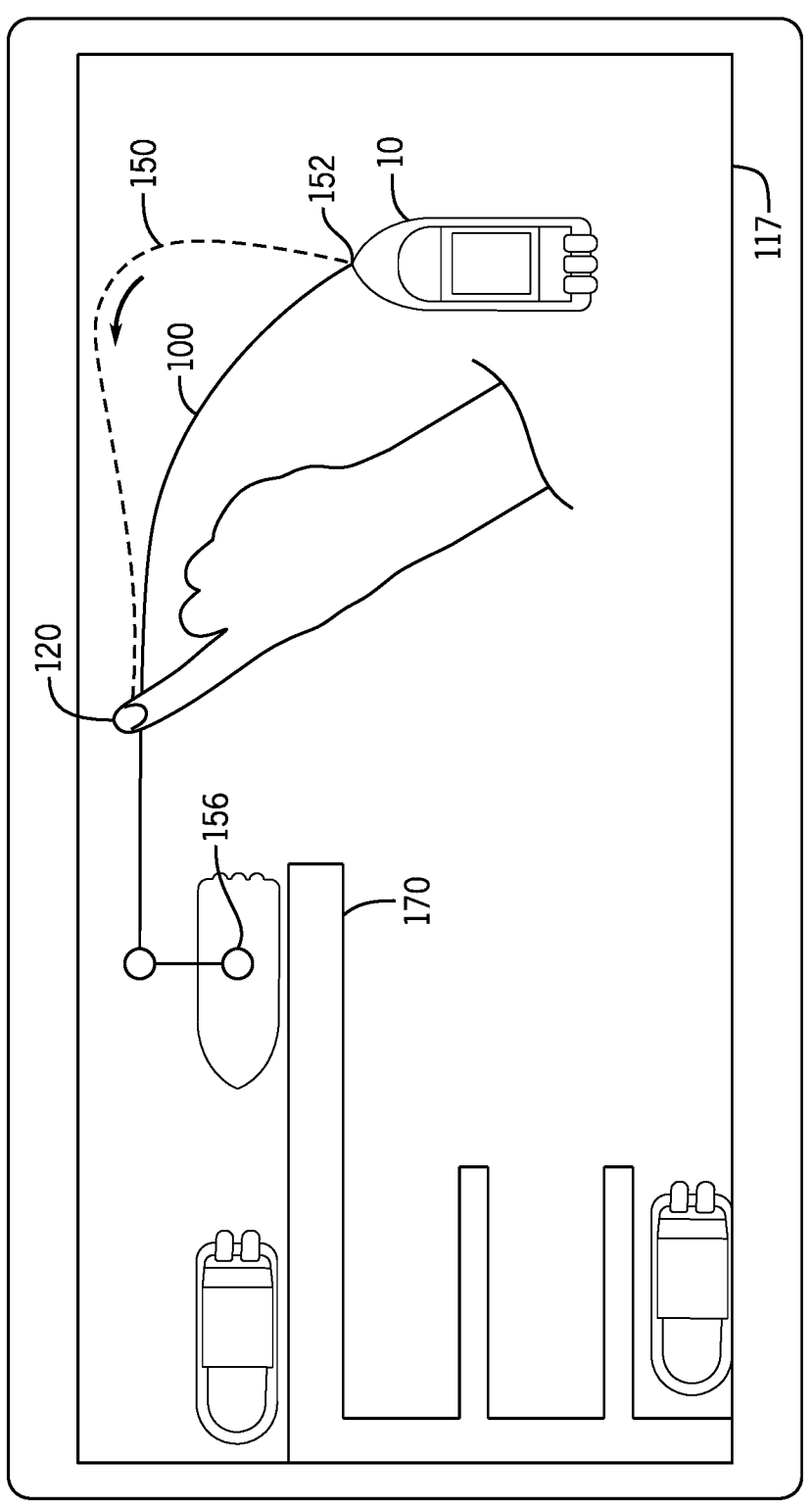
FIG. 6 is an exemplary display of a created path adjusting a navigable pathway according to one embodiment of the present disclosure.

Referring now to FIG. 5, the control system may receive user input 120 via the user interface that identifies a through point location to replace at least one geographical location in the first set of geographical locations. The through point location and the first set of geographical locations may define an adjusted navigation pathway 135 between the global position of the marine vessel 10 and the navigation target location 110. Navigations locations associated with the first navigation pathway 100, such as a turn point 154, may similarly be adjusted (as depicted by a second turn point 155) as the control system determines the adjusted navigation pathway 135. In one embodiment, the adjusted navigation pathway 135 may define a smooth path through the marine navigation area. The smooth path may be configured to enable continuous surge movement of the marine vessel 10 past the through point location. In one embodiment, the adjusted navigation pathway may include a set of geographical locations that are in proximity to the through point location when the through point location is not a feasible location for the marine vessel, such as a selected location on a dock or on shore. In another embodiment, the adjusted navigation pathway may include geographical locations that are as close as to the through point location as any predetermined buffer around the marine vessel and any identified objects may allow. In one embodiment, the control system may determine an adjusted navigation pathway 135 based on the contact made with a single selection on the display 117. In this embodiment, the control system may receive a selection on the display 117 identifying at least one geographical location to be replaced and a second selection, which may be the termination of the selection on the display 117 (e.g., a drag movement), may identify a selection of the through point location. The control system may receive two or more selections on the display identifying two or more geographical locations to be replaced and receive two or more selections on the display identifying two or more through point locations. The control system may recognize such user input and selection for an adjusted navigation pathway 135 based on adjustment of one geographical location along the pathway, such as in the adjustments shown in FIG. 5, or for generation of a new path portion as illustrated in FIG. 6. In one embodiment, identified through point locations may replace several geographical locations in the first set of geographical locations, thereby shifting a portion of the adjusted navigation pathway 135 while the rest of the geographical locations in the first set of geographical locations remain the same. This may result in only a portion of the first navigation pathway 100 being adjusted, while the rest of the original navigation pathway 100 remains relatively unchanged.

The control system may recognize user input identifying may a selection on the display from a number of user input devices such as a touch screen, keypad, trackpad, and/or joystick. Selections on the display of the user interface may be mapped by the control system to geographical locations in the marine navigation area. In one embodiment, the control system may receive a global position measurement from the GPS receiver describing a global position of the marine vessel 10. The control system may use the global position measurement of the marine vessel 10 to calculate the global position based on an earth reference frame, wherein the earth reference frame establishes where the marine vessel 10 is in relation to the earth. The global position of the marine vessel 10 may continue to be monitored by the control system as the marine vessel 10 navigates the selected navigation pathway 135, 150 towards the navigation target location 110. As the global position of the marine vessel strays from the set of geographical locations associated with the navigation pathway, the control system may control the marine drives to adjust the current global position to realign the vessel position with the set of geographical locations associated with the selected navigation pathway. The global position of the marine vessel may be monitored by a position loop that the control system uses to determine a velocity command instructing the marine vessel 10 to move forward, backward, or any other direction to navigate the marine vessel towards the selected navigation pathway.

The control system may be configured to receive a user input 120 selecting a geographical location to be replaced and/or identifying a through point location to replace at least one geographical location in the first set of geographical locations. The control system may determine the correlation between a selection on the user interface display and its corresponding geographical location in the marine navigation area by associating selected pixels of the display with a geographical grid system, and to render the display 117 of the marine navigation area accordingly. For touch screens, the control system may determine the center of a user selection on the display 117 (such as when a touch input on a touch screen contacts several sensing pixels). When defining the adjusted navigation pathway 135 based on one or more through point locations, the control system may define a smooth path through the marine navigation area. This may prevent abrupt changes in direction. For example, the control system may be configured to define the adjusted navigation pathway based on a maximum curvature requirement that allows for continuous surge navigation while following the adjusted navigation pathway to the navigation target location.

Referring now to FIG. 6, the control system may receive user input 120 identifying two or more through point locations that form a created path 150, wherein the created path 150 replaces at least a portion of the first navigation pathway 100 and defines the adjusted navigation pathway. In one embodiment, the control system may receive a selection on the display identifying a start point to the created path 150 and/or receive a selection on the display 117 identifying an end point 156 of the created path 150. In at least one embodiment, the start point 152 and the end point 156 may be geographical locations in the first set of geographical locations.

The control system may be configured to automatically adjust or adapt the created path or other adjustment user input so as to avoid objects or unnavigable areas. Thus, the control system may be configured to permit and follow a created path 150 defined in any location within the marine navigation area where the water is sufficiently deep for the marine vessel 10 and objects are avoided. When a user-inputted created path 150 encounters an object identified by the control system (such as based on perception data from the imaging system or based on chart data), the control system may generate an adjusted path based on the user input that avoids the identified object by only following a portion of the created path or otherwise adapting the user-inputted path such that it does not conflict with the identified object. In one embodiment, the control system may constrain the selectable through points and/or navigation based thereon by assigning negative bias values to unnavigable objects 170 identified in the marine navigation area, such as docks, other marine vessels, and areas of the marine navigation area marked as prohibited.

The control system may assign identified objects a predetermined buffer zone to prevent potential obstruction and/or collision with the marine vessel 10, such as assigning a buffer zone or berth distance based on the type of object. For example, the navigation path may pass closer to a buoy than it would another vessel. Alternatively or additionally, the navigation pathway may be generated to account for a buffer zone around the marine vessel, as is described above. Accordingly, the control system may be configured to autonomously adjust the created path 150 around identified objects when generating the adjusted navigation path, which may then be presented to the user for further adjustment and/or approval input. Alternatively or additionally, the control system may be configured to determine that the user-inputted created path 150 is not executable or adaptable within a predefined margin, and to generated a notification that the proposed created path is unfeasible.

In one embodiment, the system may be configured to receive a user input in the form of a continuous selection on the display 117, such as holding a finger on a touchscreen at a location associated with a point along the first navigation pathway and dragging it across the display to form the created path 150 (or a path adjustment, such as that exemplified in FIG. 5). In another embodiment, the control system may receive a plurality or series of selections on the user interface, wherein the created path 150 may be formed by connecting each identified through point location between the start point and the end point. As described above, the control system may be configured define a smooth adjusted path through the marine navigation area based on the user input, such as configured to generate a smooth path that enables continuous surge movement of the marine vessel past the through point location.

FIG. 7 illustrates an exemplary method for controlling navigation for a marine vessel. At 705, a global position measurement is received by the control system describing a current global position of the marine vessel. A navigation target location is also received, such as a target docking location or other stop point or destination location for the marine vessel. At 710, a first navigation pathway through a marine navigation area between the current global position of the vessel and the target location is defined by the control system, wherein the first navigation pathway includes a first set of geographical locations between the current vessel location and the target location. At 715, a display representing the marine navigation area and the first navigation pathway is generated on a user interface by the control system. At 720, user input is received by the control system via the user interface identifying at least one through point location to replace at least one geographical location in the first set of geographical locations. At 725, an adjusted navigation pathway between the global position of the marine vessel and the navigation target location is defined by the control system based on the at least one through point location identified by the user. Selection of through point locations and replacement of geographical locations within the first set of geographical locations may occur iteratively until the control system receives confirmation of the adjusted navigation pathway.

Figure 8:
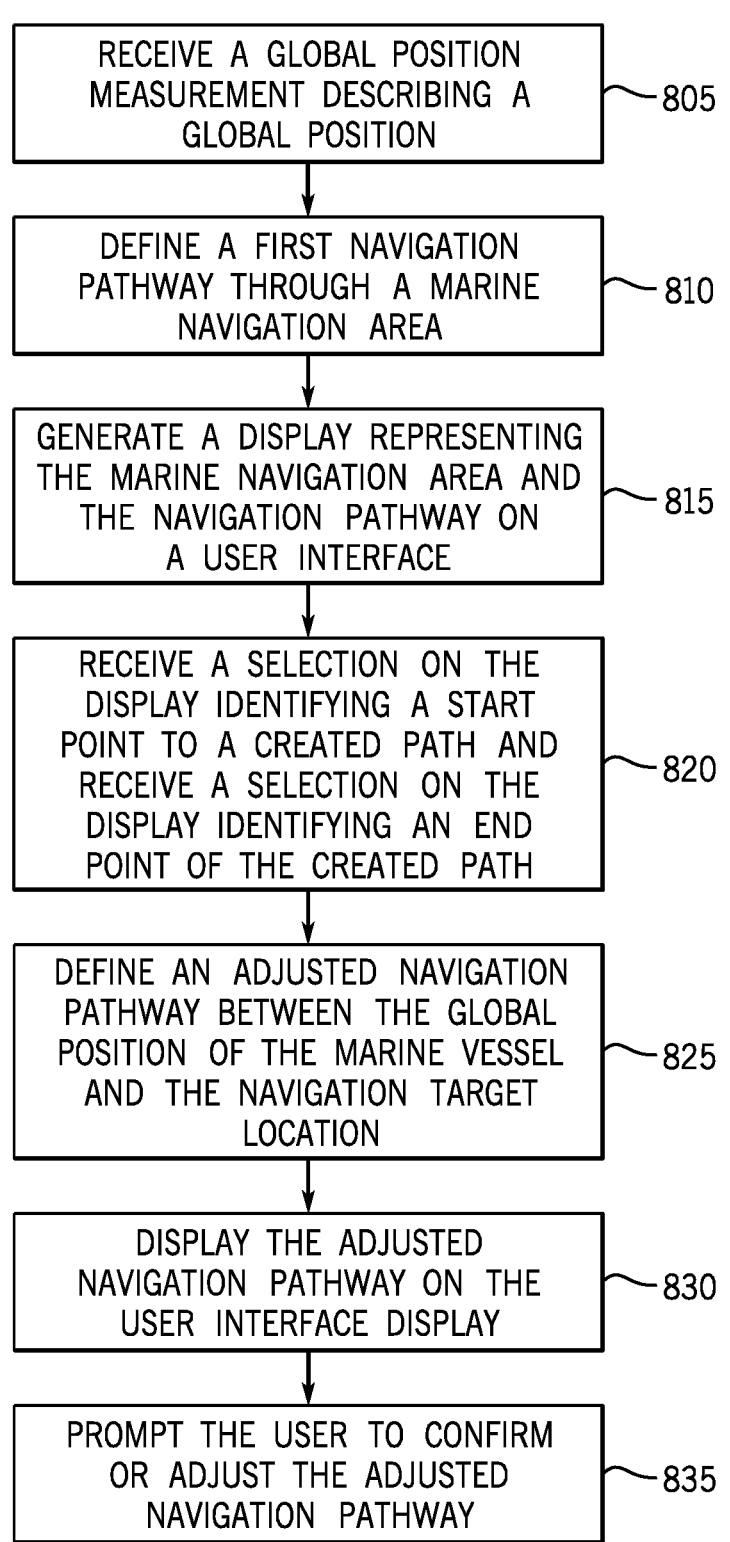

FIG. 8 illustrates another exemplary method for controlling navigation for a marine vessel. At 805, a global position measurement is received by the control system describing a current global position of the marine vessel. At 810, a first navigation pathway through a marine navigation area between the current global position of the vessel and a target location is defined by the control system. At 815, a display representing the marine navigation area and the first navigation pathway is generated on a user interface by the control system. At 820, a selection on the display is received via the user interface identifying a created path, including selected location on the display representing each of a start point of the created path, an end point of the created path, and a series of points therebetween. In one embodiment, the start point and the end point are each locations on the display associated with geographical locations in the first set of geographical locations. At 825, an adjusted navigation pathway between the global position of the marine vessel and the navigation target location is defined based on the created path, such as changing a portion of the first navigation pathway to follow the created path inputted by the user. At 830, the adjusted navigation pathway is displayed by the control system on the user interface display. In one embodiment, the control system may update the display generated at 815. At 835, the control system prompts the user to confirm or adjust the adjusted navigation pathway, as represented on the display of the user interface. In one embodiment, adjustment of the adjusted navigation pathway may replace one or more geographical locations within the set of geographical locations defining the adjusted navigation pathway, as described above. Upon displaying the adjusted navigation pathway, the control system may continue to prompt for confirmation or adjustment to the adjusted navigation pathway until the user input received by the control system accepts the adjusted navigation pathway, at which point the navigation controller may begin controlling propulsion of the marine vessel such that if follows the adjusted navigation pathway.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method of controlling navigation for a marine vessel, the method comprising:

receiving a global position measurement describing a global position of the marine vessel;

defining a first navigation pathway through a marine navigation area, wherein the first navigation pathway includes a first set of adjacent geographical locations for continuous surge movement of the marine vessel between the global position of the marine vessel and a navigation target location;

generating a display representing the marine navigation area and the first navigation pathway on a user interface;

receiving a user input via the user interface identifying a plurality of adjacent through point locations that form a created path between a start point and an end point, wherein the start point and the end point are non-adjacent geographical locations in the first set of geographical locations and define a portion of the first navigation pathway;

defining an adjusted navigation pathway by replacing geographical locations in the portion of the first navigation pathway based on the plurality of adjacent through point locations; and automatically controlling one or more marine drives on the marine vessel based on the adjusted navigation pathway to enable continuous surge movement of the marine vessel between the global position of the marine vessel and the navigation target location through the plurality of the adjacent through point locations.

2. The method of claim 1, further comprising, upon generating the display representing the marine navigation area and the first navigation pathway between the global position of the marine vessel and the navigation target location and prior to receiving the plurality of adjacent through point locations, prompting a user to confirm or adjust the first navigation pathway.

3. A navigation system for a marine vessel, the system comprising:

a user interface display on a marine vessel;

a global position system configured to measure a global position of the marine vessel and generate a global position measurement;

a control system configured to:

receive the global position measurement describing the global position of the marine vessel;

define a first navigation pathway through a marine navigation area, wherein the first navigation pathway includes a first set of adjacent geographical locations for continuous surge movement of the marine vessel between the global position of the marine vessel and a navigation target location;

generate a display representing the marine navigation area and the first navigation pathway on a user interface;

receive a user input via the user interface identifying a plurality of adjacent through point locations that form a created path between a start point and an end point, wherein the start point and the end point are non-adjacent geographical locations in the first set of geographical locations and define a portion of the first navigation pathway;

define an adjusted navigation pathway by replacing geographical locations in the portion of the first navigation pathway based on the plurality of adjacent through point locations; and automatically control one or more marine drives on the marine vessel based on the adjusted navigation pathway and the global position measurements to enable continuous surge movement of the marine vessel between the global position of the marine vessel and the navigation target location through the plurality of the through point locations.

4. The method of claim 1, further comprising receiving a selection on the display identifying the start point to the created path and receiving a selection on the display identifying the end point of the created path.

5. The system of claim 3, further comprising an imaging system configured to image an area around the marine vessel and to generate image data based thereon, wherein the control system is further configured to:

receive the image data; and generate the display of the marine navigation area on the user interface based on the image data.

6. The method of claim 1, further comprising receiving a selection on the display identifying the geographical locations in the portion of the first navigation pathway to be replaced and a selection on the display identifying the plurality of adjacent through point locations.

7. The system of claim 3, wherein the control system is further configured to receive a selection on the display identifying the geographical locations in the portion of the first navigation pathway to be replaced and a selection on the display identifying the plurality of adjacent through point locations.

8. The method of claim 1, wherein the first navigation pathway remains unchanged other than the portion between the start point and the end point.

9. The method of claim 1, further comprising:

imaging an area around the marine vessel with an imaging system to generate image data; and generating the display representing the marine navigation area on the user interface based on the image data.

10. The method of claim 9, further comprising:

identifying at least one object in the image data between the global position of the marine vessel and the navigation target location;

defining the first navigation pathway to avoid the at least one identified object.

11. The system of claim 3, wherein the first navigation pathway remains unchanged other than the portion between the start point and the end point.

12. The system of claim 3, wherein the control system is further configured to, upon generating the display representing the marine navigation area and the first navigation pathway between the global position of the marine vessel and the navigation target location and prior to receiving the plurality of adjacent through point locations, prompt a user to confirm or adjust the first navigation pathway.

13. The system of claim 3, wherein the adjusted navigation pathway is defined to maintain a predetermined distance from an identified object.

14. The system of claim 3, wherein the control system is further configured to receive a selection on the display identifying the start point to the created path and receiving a selection on the display identifying the end point of the created path.

\*    \*    \*    \*    \*